US008921734B2

(12) United States Patent
Yerazunis et al.

(10) Patent No.: US 8,921,734 B2
(45) Date of Patent: Dec. 30, 2014

(54) LASER CUTTING MACHINE

(75) Inventors: William S. Yerazunis, Acton, MA (US); John C. Barnwell, III, Leominster, MA (US); Scott A. Bortoff, Brookline, MA (US); Vijay Shilpiekandula, Belmont, MA (US); Abraham Goldsmith, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 478 days.

(21) Appl. No.: 13/294,096

(22) Filed: Nov. 10, 2011

(65) Prior Publication Data

US 2013/0119027 A1    May 16, 2013

(51) Int. Cl.
*B23K 26/08* (2014.01)
*B23K 26/38* (2014.01)

(52) U.S. Cl.
USPC ............................. 219/121.67; 219/121.72

(58) Field of Classification Search
CPC ..... B23K 26/08; B23K 26/0867; B23K 26/38
USPC ........................ 219/121.67–121.72, 121.77
See application file for complete search history.

(56) References Cited

U.S. PATENT DOCUMENTS

| | | | | |
|---|---|---|---|---|
| 5,471,395 A | * | 11/1995 | Brien | 700/186 |
| 5,751,585 A | | 5/1998 | Cutler | |
| 5,798,927 A | | 8/1998 | Cutler et al. | |
| 6,087,625 A | * | 7/2000 | Iso | 219/121.8 |
| 6,214,279 B1 | * | 4/2001 | Yang et al. | 264/482 |
| 6,696,667 B1 | * | 2/2004 | Flanagan | 219/121.72 |
| 7,292,910 B2 | | 11/2007 | Gmeiner et al. | |
| 7,456,372 B2 | * | 11/2008 | Hiramatsu | 219/121.7 |
| 7,767,932 B2 | | 8/2010 | Zeygerman et al. | |

FOREIGN PATENT DOCUMENTS

| | | | |
|---|---|---|---|
| EP | 0738556 A1 | | 10/1996 |
| EP | 0738556 B1 | * | 12/1997 |

* cited by examiner

*Primary Examiner* — Samuel M Heinrich
(74) *Attorney, Agent, or Firm* — Dirk Brinkman; Gene Vinokur (57) ABSTRACT

A laser cutting machine includes a platform and a motion system. The motion system includes a first prismatic joint facilitating a first motion of the platform along a first direction and a second prismatic joint facilitating a second motion of the platform along a second direction. A galvano arranged on the platform, such that a motion of the platform causes a motion of the galvano, the galvano including a first mirror, wherein a third motion of the first mirror positions the laser beam along a third direction, and a second mirror, wherein a fourth motion of the second mirror positions the laser beam along a fourth direction. A control module controls concurrently the motion system and the galvano, such that a position of the laser beam on the workpiece is a vector sum of the first motion, the second motion, the third motion, and the fourth motion.

20 Claims, 5 Drawing Sheets

LASER CUTTING MACHINE

FIELD OF THE INVENTION

This invention relates generally to a laser cutting machine, and more particularly to a system for directing a laser beam of a laser cutting machine at a workpiece.

BACKGROUND OF THE INVENTION

Common methods of operation in laser cutting machines for sheet materials perform two-dimensional (2D) relative motion between a laser and a workpiece, such that a laser beam cuts the workpiece as the beam moves. In such machines, there are three options. A position of the laser is fixed and the workpiece is moved in X and Y directions. A position of the workpiece is fixed and the laser is moved in the X and the Y directions. The laser is fixed in the Y direction and moves in the X direction, and the workpiece is fixed in X direction and moves in Y direction.

For example, a laser tube cutter fixes the position of the laser, and the position of the workpiece is translated and rotated to a focus point of the laser. In contrast, large $CO_2$ laser cutters used for cutting steel plate leaves the position of the workpiece stationary, and move the laser. A machine of the third type, such as a sign cutter, which needs to operate on very long lengths of material, spools the flexible material in the Y direction, while moving the laser only in the X direction.

Each type of machine has advantages and disadvantages, most of which are based on the final production rate and work material characteristics. To a significant extent, the ultimate speed of the laser cutting machine is determined by inertia of the parts of the machine that have to move in order to make the cut.

For example, in one laser cutting machine, the weight of a lens carriage is on the order of 50 Kg, riding on a Y-axis weighing on the order of 200 Kg, while the workpiece itself may weigh as much as 1000 Kg. In this case, it makes sense to move the lens carriage in both the X and Y directions as the lens carriage has inertia lower than the workpiece. In such laser cutting machine, the lens carriage is equipped with diagonal transfer mirrors, or an optical fiber to transfers the laser beam from the laser power oscillator to the lens carriage.

A limiting factor on production rate is directly related to the inertia of the components of the laser cutting machine. Therefore, reduction of the effective inertia of the components has a direct impact on the productivity of the laser cutting machine.

For example, one laser cutting machine uses a pair of redundant axes of the motion, i.e., a planar gantry with a high inertia, and a polar gantry with a low inertia. However, the inertia of the laser even in this machine is still relatively large, as the laser focusing lens itself is moved. Such motion also stresses the precision optics of the laser focusing lens and may lead to a suboptimal cut.

Another possible method of reducing inertia is to replace the X-Y motion completely with a pair of mirrors moved by galvano drives. Each galvano drive and mirror assembly provides one axis of deflection to a laser beam. By using two such galvano drives at right angles, a rectilinear area can be scanned. To simplify this assembly for system builders, Nutfield and Edmund Industrial Optics also sell pre-packaged XY galvano system "scan heads" in both open-frame and enclosed form factors for use as black-box components in constructing video and laser systems. With a suitable choice of lenses and lasers, these XY galvano scan heads can be used as beam directors, or as laser engraving devices.

In one exemplar laser drilling machine, the workpiece is mounted onto a worktable and fixed in position. The worktable is then traversed in the X and Y directions, and a pair of video cameras is used to precisely locate the workpiece with respect to the machine frame and the laser lens. A position of the workpiece table is locked, and the laser beam is directed solely by motion of two galvano drives rotating a pair of mirrors arranged to deflect the beam in both the X and Y direction. The drilling laser beam then travels through an F-theta field-flattening lens so that the beam is focused to under 100 microns diameter at any point on the workpiece surface, despite the change in distance due to the beam moving along the diagonal. Because the galvano drive and F-theta lens have only a limited rotation and limited beam aperture (approximately +/-15 degrees mechanical for the galvanos and 25 mm aperture for the F-theta lens), the workpiece accessible area is limited to roughly 50 mm×50 mm (about a 2" square). After all laser drilling desired in the 50 mm×50 mm area is completed, the traversing table is unlocked and the traversing motors are used to move the workpiece to the next work zone, where the workpiece is again precisely located via video cameras, locked, and the galvano is used for the cutting.

In another machine, the XY galvano scanhead is placed on the end of a multi-axial industrial robot arm. The path of the robot end is then constrained to stay within a "mobility tube" describing the set of positions where the galvano scanhead is capable of aiming at the area to be machined. The correct set of multi-axial robot joint motions, combined with the proper galvano drive signals is dynamically determined by the control unit. However, avoidance of "robot arm crashes" in this design, i.e., situations where the robot arm tries to pass through itself or through the workpiece, is computationally difficult, and requires not only an accurate model of the robot arm and scanhead, but also a continuously evolving model of the workpiece during different stages of the cutting process, because a forbidden motion at one stage in the cutting process may be available for another stage of the process.

Accordingly, there is a need in the art to address disadvantages described above.

SUMMARY OF THE INVENTION

It is an object of the invention to increase productivity of a laser cutting machine.

It is further object of the invention to increase productivity of the laser cutting machine suitable for cutting large parts of a workpiece with fine details.

It is further object of the invention to minimize moving mass of a low-inertia beam directing mechanism of a large-workpiece laser cutter machine.

It is further object of the invention to avoid mechanical crashes of the components of the laser cutting machine and to simplify the controlling of the machine.

Some embodiments of the invention are based on a realization that the speed of a laser cutter machine can be improved by using a fast, low-inertia galvano arranged on a platform configured to move in a plane parallel to a workpiece over a length substantially equal to a length of the workpiece. The motion of the platform overcomes the limitations on a small working area of the galvano, and the galvano overcomes limitation of the inertia of the platform. Moreover, the rigidity of the platform and the motion of the platform suitable for precise cutting can be facilitated by prismatic joints.

Furthermore, the galvano can be arranged on the platform such that mechanical crashes of the galvano and the platform are precluded. Such arrangement allows for simplification of the controlling operation of the laser cutting machine. Moreover, such arrangement allows for summing the motions of the galvano and the platform to increase the speed of the laser cutting. Also, arranging the galvano on the platform in the position fixed with respect to the workpiece further allows increasing the speed of the laser cutting. For example, by orienting the galvano at 45 degrees from the motion of the platform, so the common horizontal and vertical cuts can be done simultaneously by both the motion of both galvano axes and the relevant axis motion of the platform. Such orientation result in gaining another factor of 1.4 in cutting speed.

Accordingly, one embodiment of the invention discloses a laser cutting machine, which can include a platform; a motion system for moving the platform in a plane parallel to a workpiece, the motion system including a first prismatic joint facilitating a first motion of the platform along a first direction and a second prismatic joint facilitating a second motion of the platform along a second direction; a galvano arranged on the platform, such that a motion of the platform causes a motion of the galvano, the galvano including a first mirror, wherein a third motion of the first mirror positions the laser beam along a third direction, and a second mirror, wherein a fourth motion of the second mirror positions the laser beam along a fourth direction; and a control module for controlling concurrently the motion system and the galvano, such that a position of the laser beam on the workpiece is a vector sum of the first motion, the second motion, the third motion, and the fourth motion.

The galvano may be arranged on the platform such that the third direction is fixed with respect to the first direction, and the fourth direction is fixed with respect to the second direction. For example, the galvano may be arranged on the platform such that the first direction coincides with the third direction, and the second direction coincides with the fourth direction. Alternatively, the galvano may be arranged on the platform such that the first direction forms an angle of 45 degrees with the third direction, and the second direction forms the angle of 45 degrees with the fourth direction.

The galvano may be permanently fixed to the platform during the operation of the machine. Also, the galvano may be arranged on the platform rotationally, such that mutual orientations of the first direction and the second direction can be changed before the operation of the machine.

Another embodiment discloses a laser cutting machine, including: a platform configured to move along at least a first direction; a galvano arranged on the platform, such that a motion of the platform along the first direction causes a motion of the galvano along the first direction, wherein an operation of the galvano directs the laser beam to the workpiece along at least a second direction, wherein the galvano is arranged on the platform such that the second direction is fixed with respect to the first direction during the operation; and a control module for controlling the motion of the platform and the operation of the galvano, such that the laser beam is directed concurrently along the first direction and along the second direction.

Yet another embodiment discloses a method for controlling an operation of a laser cutting machine, wherein the laser cutting machine includes a galvano arranged on the platform, such that a motion of the platform along a first direction and along a second direction causes a motion of the galvano along the first and the second directions, wherein a motion of the galvano directs a laser beam along a third direction, and along a fourth direction, and wherein mutual orientation of the first direction, the second direction, the third direction and the fourth direction is permanently fixed during the operation of the machine. The method may include determining instructions for controlling the motion of the platform and the motion of the galvano, wherein the instruction defines a cutting path of the laser beam, such that a position of the laser beam on the cutting path is a vector sum of the motions along the first direction, the second direction, the third direction and the fourth direction; and controlling concurrently the motion system and the motion of the galvano according to the instructions. The instructions may include G-code.

DETAILED DESCRIPTION OF THE PREFERRED EMBODIMENT

Figure 1:
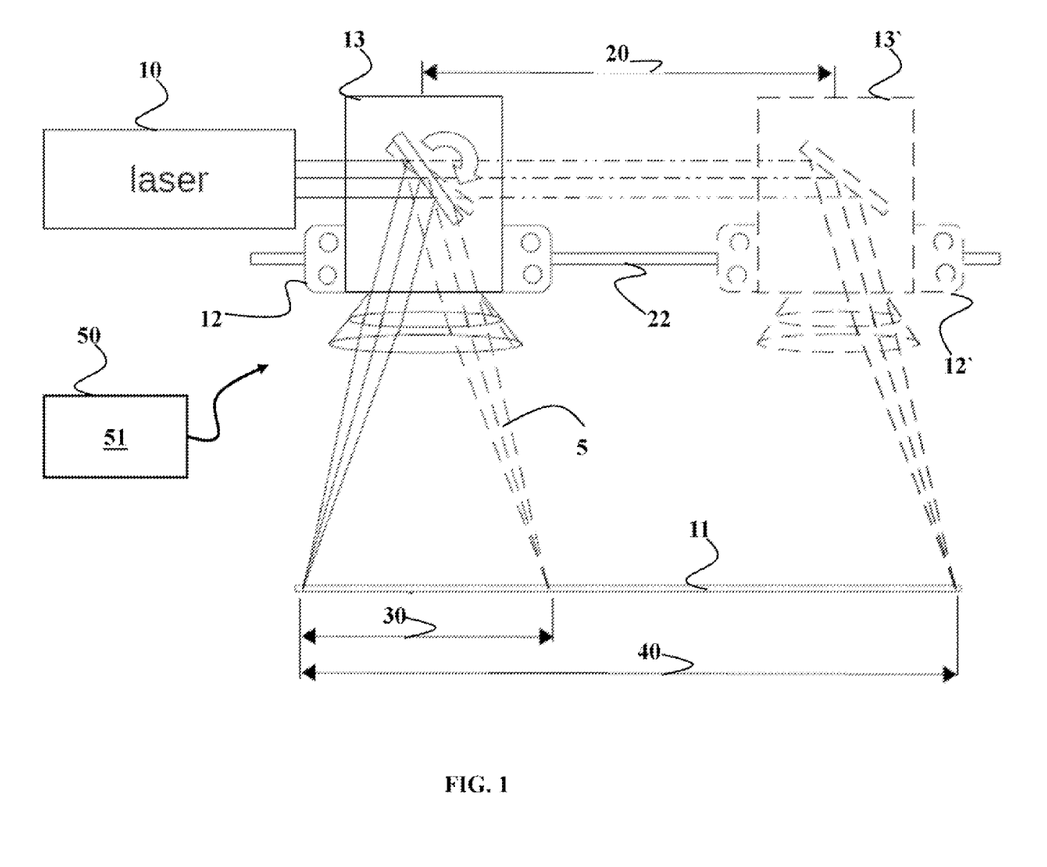
FIG. 1 is a block diagram of a laser cutting machine according to one embodiment of an invention.

FIG. 1 shows a block diagram of a laser cutting machine suitable for controlling a position of a beam produced by a laser 10 on a workpiece 11. The laser cutting machine includes a platform 12 configured to move along at least a first direction 20. The platform is moved by a motion system 22 for moving the platform in a plane parallel to the workpiece. In one embodiment, the motion system 22 includes a first prismatic joint facilitating a first motion of the platform along the first direction 20.

The laser cutting machine also includes a galvano 13 arranged on the platform 12, such that the motion of the platform along the first direction 20 causes a motion of the galvano along the first direction. For example, the galvano can include a reversible DC motor, equipped with a mirror on an output shaft, and usually with built-in bump stops, to limit rotation of the mirror to a small angle, typically +/−20 to 30 degrees about the center. Such galvanos are often sold as complete units.

For example, the motion of the platform to a position 12' moves the galvano to a position 13'. Also, an operation of the galvano directs the laser beam to the workpiece along at least a second direction 30. The galvano is arranged on the platform such that the second direction 30 is fixed with respect to the first direction 20, which allows directing the laser beam concurrently along the first direction and along the second direction. In various embodiments, the position of the laser beam on the workpiece is a vector sum 40 of the first motion, and the second motion. The motion of the platform and the operation of the galvano are controlled by a control module 50. The control module 50 can be implemented using a processor 51.

Such arrangement of the galvano on the platform precludes mechanical crashes of the galvano with the platform during the operation of the laser cutting machine and allows for simplification of the controlling operation of the laser cutting machine. Moreover, such arrangement allows for summing the motions of the galvano and the platform to reduce the time required for the laser cutting.

Other variations of the design of the laser cutting machine of FIG. 1 are possible and within the scope of the invention. For example, in some embodiment, the platform is configured to move in two directions and the motion system 22 includes a first prismatic joint facilitating a first motion of the platform along a first direction and a second prismatic joint facilitating a second motion of the platform along a second direction. Similarly, the galvano may include a first mirror, wherein a third motion of the first mirror positions the laser beam along a third direction, and a second mirror, wherein a fourth motion of the second mirror positions the laser beam along a fourth direction. In such embodiments, the control module 50 controls concurrently the motion system and the galvano, such that the position of the laser beam on the workpiece is a vector sum of the first motion, the second motion, the third motion, and the fourth motion.

Figure 2:
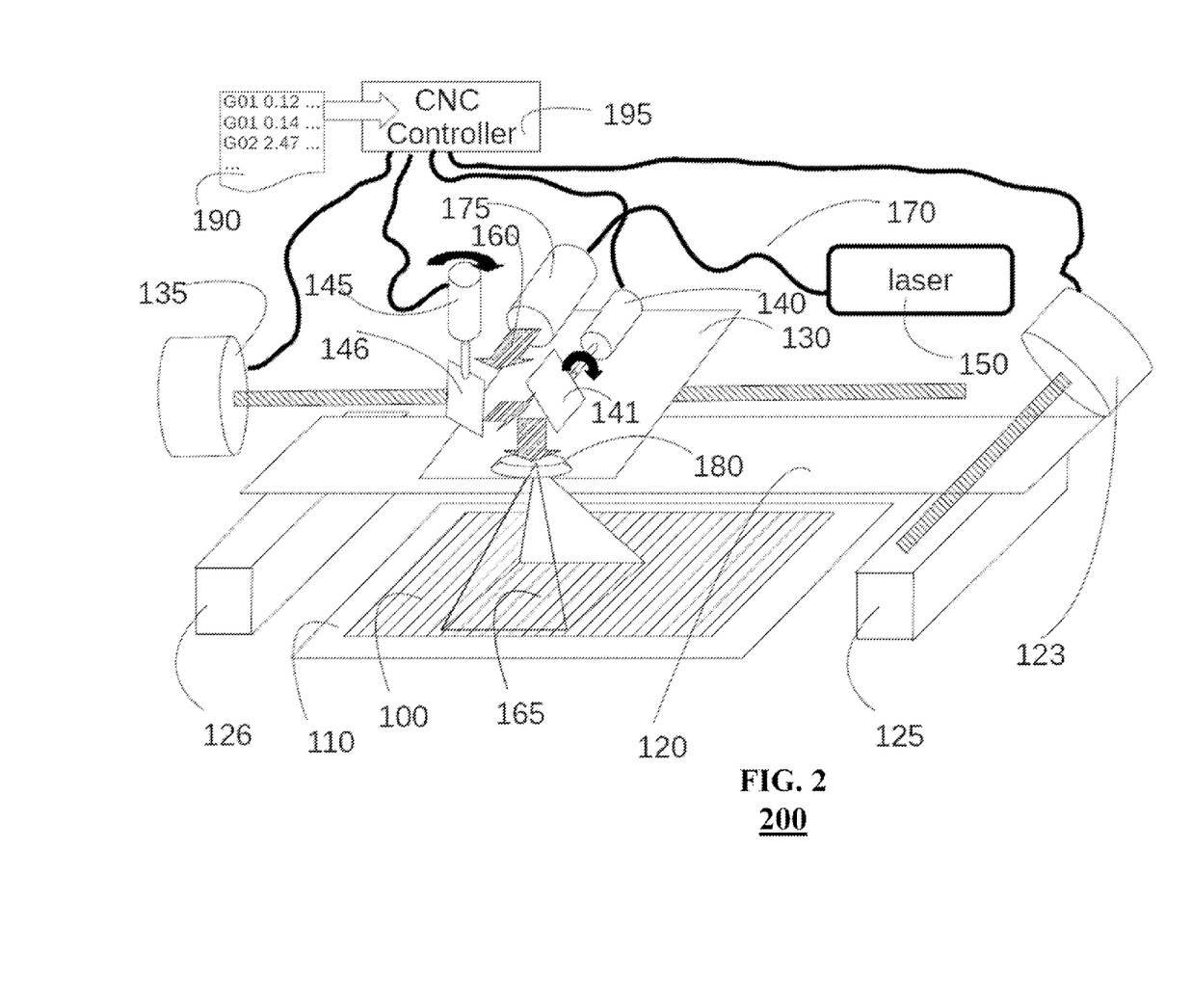
FIG. 2 is an isometric view of a laser cutting machine according to one embodiment of an invention.

FIG. 2 shows an isometric view of a laser cutting machine 200 according to one embodiment of an invention. The laser cutting machine 200 is shown for illustration purpose only and is not intended to limit the scope of the invention.

A workpiece 100 is supported on a beam dump 110 beneath a gantry 120. The gantry moves on rails 125 and 126 along a first direction, e.g., along a Y-axis. The gently 120 is moved along the first direction by a first servo motor and a first screw 123. A platform 130 is arranged on the gantry 120 and moves with the gantry along the first direction. Also, the platform 130 is moved along a second direction, e.g., along an X-axis, by a second servo motor and a second screw 135. In this embodiment, the gently 120, the first servo motor and the first screw 123, and the second servo motor and the first screw 135 form a motion system for moving the platform in a plane parallel to the workpiece along the first and the second direction. However, other embodiments of the invention use different types of the prismatic joints to move the platform. For example, the first prismatic joint can include a first direction linear drive motor, and the second prismatic joint can include a second direction linear drive motor.

The galvano, e.g., a two-axis galvano scan head having two orthogonal galvano drives, i.e., a first drive 140 and a second drive 145, a first mirror 141 and a second mirror 146, is arranged on the platform 130. A third motion of the first mirror 141 caused by the first driver 140 positions the laser beam along a third direction, and a fourth motion of the second mirror 146 caused by the second driver 145 positions the laser beam along a fourth direction.

In various embodiments, the galvano is arranged on the platform such that the third direction is fixed with respect to the first direction, and the fourth direction is fixed with respect to the second direction. For example, in one embodiment, the first direction coincides with the third direction, and the second direction coincides with the fourth direction. In another embodiment, the first direction forms an angle of 45 degrees with the third direction, and the second direction forms the angle of 45 degrees with the fourth direction.

The galvano can be affixed to the platform in order to fix the direction of motion. Alternatively, the galvano can be arranged on the platform rotationally, such that the mutual orientations of the first, the second, the third, and the fourth directions can be fixed before, or during the operation of the laser cutting machine.

The laser cutting machine 200 can include a laser 150 for delivering cutting laser beam 160 to the first 141 and the second 146 mirrors of the galvano via an optical fiber 170 and a collimator 175. In an alternative embodiment, the laser beam is delivered to the galvano via diagonal mirrors riding along the Y-gantry and X-axis platform. However, other variations are also possible.

The collimated cutting laser beam 160 is directed by the mirrors through a focusing module 180 for focusing the laser beam on the workpiece, producing a combined X-axis and Y-axis galvano scan area 165 onto workpiece 100, and cutting the workpiece 100. An example of the focusing module 180 is a field-flattening F-theta lens or a non-telecentric F-theta lens. A size of the workpiece 100 can be greater than the galvano scan area 165 due to the motion of the platform.

In some embodiments, the control module includes a computer numerical control (CNC) controller 195. The control module controls the motion system and the galvano according to precomputed G-code 190 that defines a trajectory of positions of the laser beam. For example, the G-code 190 encodes positions for the X-axis platform 140 as motion on the G-code axis X, the Y-axis gantry 120 as motion on G-code axis Y, X-motion galvano and mirror 144 as motion on G-code axis A, and Y-motion galvano and mirror 145 as motion on G-code axis B. This four-axis G-code is interpreted by the controller in during the operation of the laser cutting machine.

The interpretation of the G-code for the laser cutting machine has similarities with interpretation of the G-code for a milling machine with an extraordinarily fast trunnion table tilting in the A and B axes and having no motion in Z direction, other than "home to zero."

For example, the G-code actions such as an action G01, i.e., "interpolated linear motion", an action G02, "clockwise circular interpolation," and an action G03, i.e., "counterclockwise circular interpolation," can be directly performed by the laser cutter. Other G-code actions are mapped to the operations on the laser cutter. For example, an action M03, i.e., "set cutting spindle speed," can set a power of the laser, and an action M06, i.e., "tool change." is used to change lenses.

In the embodiment shown in FIG. 2, the galvano is arranged on the platform such that the first direction coincides with the third direction, and the second direction coincides with the fourth direction.

Figure 3:
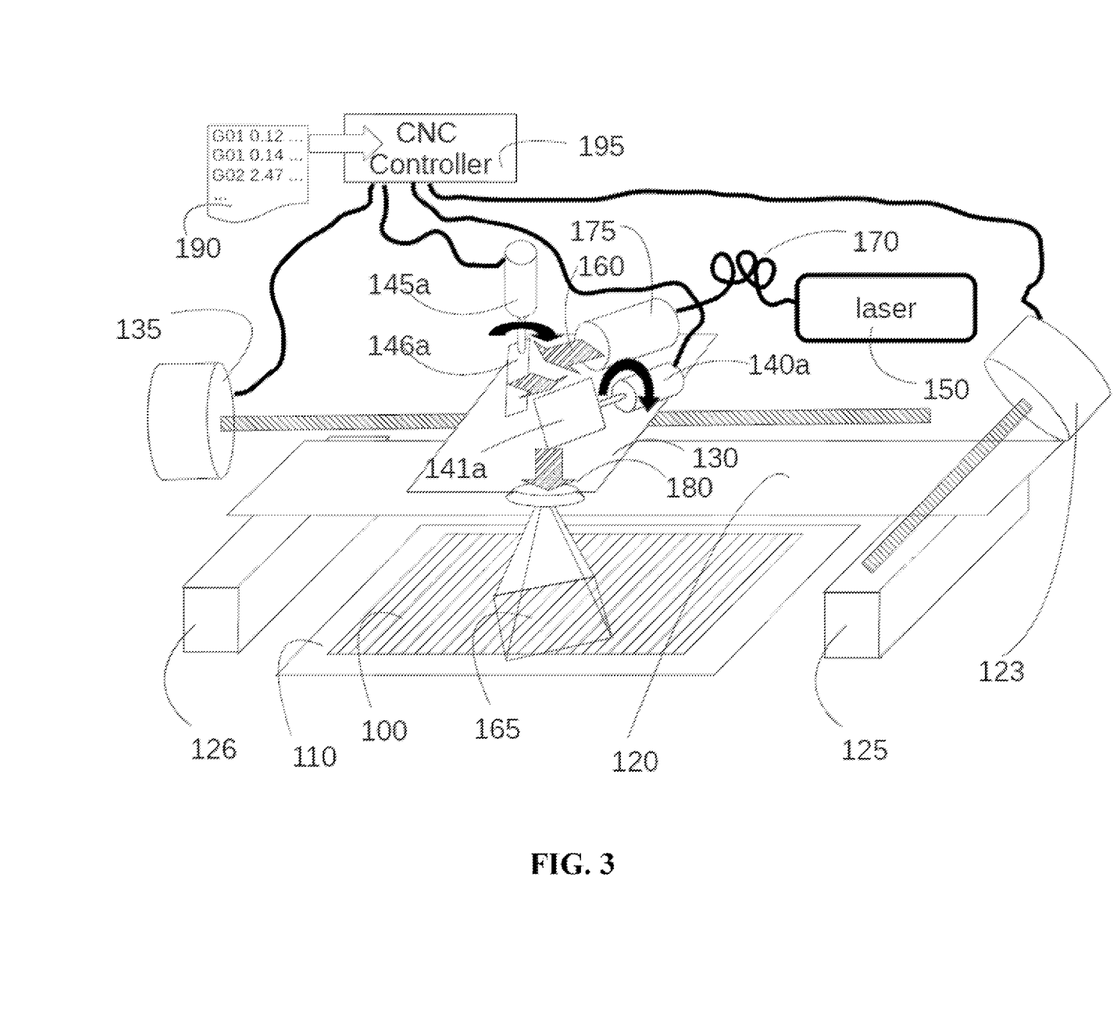
FIG. 3 is an isometric view of a laser cutting machine according to another embodiment of the invention.

FIG. 3 shows alternative embodiment, wherein the first direction forms an angle with the third direction, and the second direction forms an angle with the fourth direction.

For example, the galvano and mirror drives referred, respectively, as 140, 141, 145, and 146 in FIG. 2, are rotated, in the embodiment of FIG. 3, with 45 degrees on a vertical axis and referred to as 140a, 141a, 145a, and 146a, respectively. For example, the first driver 140a and the first mirror 141a positioned such that the angle between the motion produced by the platform 130 along the first direction and the motion produced by the galvano along the third direction, i.e., using the first driver 140a and the first mirror 141a, is approximately 45 degrees. Similarly, the second driver 145a and the second mirror 146a positioned such that the angle between the motion produced by the platform 130 along the second direction and the motion produced by the galvano along the fourth direction, i.e., using the second driver 145a and the second mirror 146a, is approximately 45 degrees.

This embodiment is based on a realization that there is a preference of either vertical or horizontal (or nearly vertical or horizontal) lines of a cutting pattern. Since smaller details are cut at a high speed by the low-inertia galvano, the maximum cutting speed for small details is proportional to the maximum acceleration that drivers of the galvano can achieve without damage.

Figure 4:
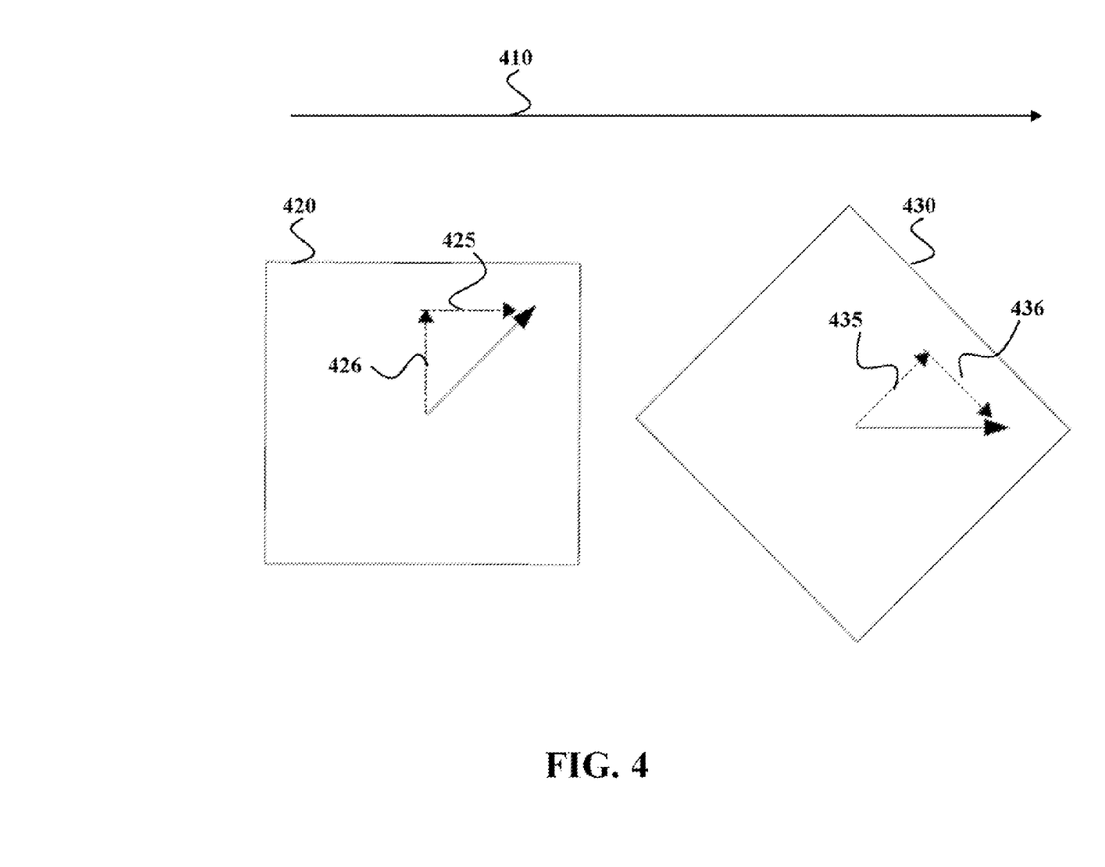
FIG. 4 is a schematic of a vector sum of the motions of positioning a laser beam according to some embodiments of the invention.

FIG. 4 illustrates the rationale behind arranging the galvano on the platform such that the motions of the galvano are fixed with respect to the motions of the platform. For example, the platform has a motion along a direction 410, which is a common direction of a cutting pattern. Typically, the direction 410 is a vertical or horizontal direction in the coordinate system of the workpiece.

The galvano is arranged on the platform such that the accelerations of the drivers of the galvano results in the motion of the laser beam in addition to the motion of the platform. For example, the galvano 420 is arranged such that acceleration of only one driver along the direction 425 contributes to the common motion of the laser beam along the direction 410. This is because the acceleration of another driver results in the motion of the laser beam along a direction 426 perpendicular to the direction 410.

In another example, the galvano 430 is rotated 45 degrees on a vertical axis, such that the acceleration of drivers of the galvano results in the motions along the direction 435 and 436 and can concurrently contribute to the motion of the laser beam along the direction 410. Because the acceleration of the laser beam is proportional to the Pythagorean sum of the two orthogonal galvano, the horizontal and vertical cuts of the galvano 430 can be performed approximately 1.41 times ($\sqrt{2}$) faster then cuts of the galvano 420. Conversely, the more seldom-used diagonal cutting motions are now performed solely with a single galvano motion, and are slower.

Figure 5:
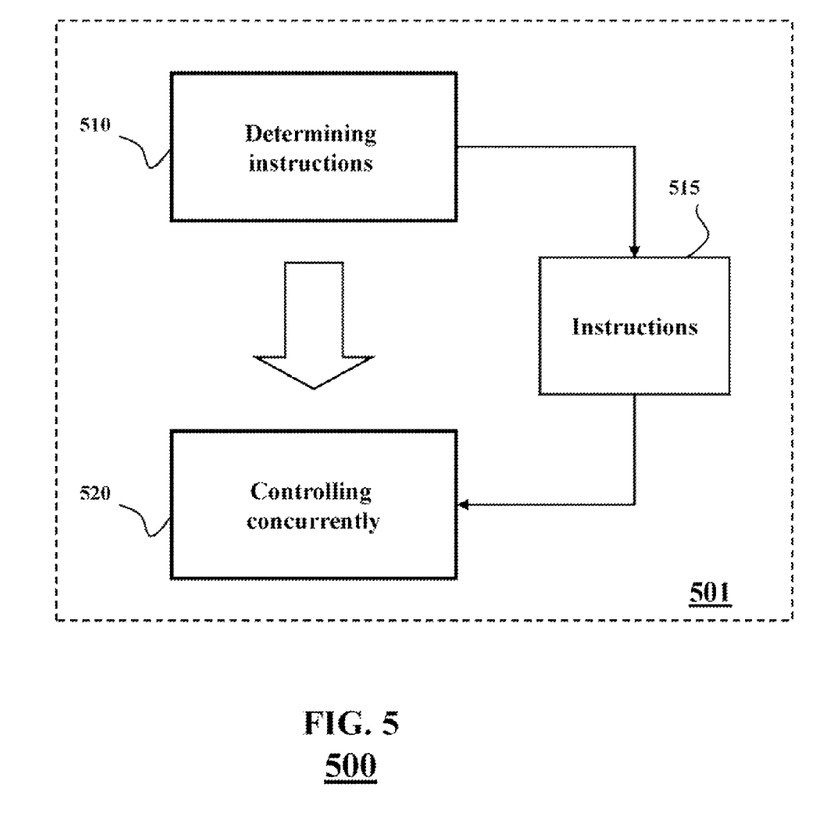
FIG. 5 is a block diagram of a method for controlling the operation of the laser cutting machine according to some embodiments of the invention.

FIG. 5 shows a block diagram of a method 500 for controlling the operation of the laser cutting machine. The laser cutting machine includes a galvano arranged on the platform, such that a motion of the platform along a first direction and along a second direction causes a motion of the galvano along the first and the second directions, wherein a motion of the galvano directs a laser beam along a third direction, and along a fourth direction, and wherein mutual orientation of the first direction, the second direction, the third direction and the fourth direction is permanently fixed during the operation of the machine.

Typically before the beginning of the operation, instructions 515 for controlling the motion of the platform and the motion of the galvano are determined 510. The instruction defines a cutting path of the laser beam, such that a position of the laser beam on the cutting path is a vector sum of the motions along the first direction, the second direction, the third direction and the fourth direction.

During the operation, the motion system and the motion of the galvano are controlled concurrently 520 according to the instructions. In one embodiment, the instructions include G-code. The method 500 can be implemented using a processor 501. For example, the processor may be implemented as integrated circuits, with one or more processors in an integrated circuit component. Though, a processor may be implemented using circuitry in any suitable format.

Effect of the Invention

Embodiments of the invention result in increasing a productivity of a laser cutting machine. Specifically, the combination of the galvano arranged on a movable platform in a fixed position allows for cutting large parts of a workpiece with fine details, avoid mechanical crashes of the components of the laser cutting machine, simplify the controlling of the machine, and increase a speed of the operation of the laser cutting machine.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A laser cutting machine, comprising:
a laser for generating a laser beam suitable for cutting a workpiece;
a platform;
a motion system for moving the platform in a plane parallel to the workpiece, the motion system including a first prismatic joint facilitating a first motion of the platform along a first direction and a second prismatic joint facilitating a second motion of the platform along a second direction;
a galvano arranged on the platform, such that a motion of the platform causes a motion of the galvano, the galvano including a first mirror, wherein a third motion of the first mirror positions the laser beam along a third direction, and a second mirror, wherein a fourth motion of the second mirror positions the laser beam along a fourth direction; and
a control module for controlling concurrently the motion system and the galvano, such that a position of the laser beam on the workpiece is a vector sum of the first motion, the second motion, the third motion, and the fourth motion.

2. The machine of claim 1, wherein the galvano is arranged on the platform such that the third direction is fixed with respect to the first direction, and the fourth direction is fixed with respect to the second direction.

3. The machine of claim 1, wherein the galvano is arranged on the platform such that the first direction coincides with the third direction, and the second direction coincides with the fourth direction.

4. The machine of claim 1, wherein the galvano is arranged on the platform such that the first direction forms an angle of 45 degrees with the third direction, and the second direction forms the angle of 45 degrees with the fourth direction.

5. The machine of claim 1, further comprising:
a focusing module for focusing the laser beam on the workpiece.

6. The machine of claim 5, wherein the focusing module includes a telecentric F-theta lens.

7. The machine of claim 1, wherein the control module includes a computer numerical control (CNC) controller.

8. The machine of claim 7, wherein the control module controls the motion system and the galvano according to precomputed G-code defining a cutting path of the laser beam.

9. The machine of claim 1, wherein the motion system includes a pair of rails.

10. The machine of claim 1, wherein the first prismatic joint includes a first servo motor and a first screw, and wherein the second prismatic joint includes a second servo motor and a second screw.

11. The machine of claim 1, wherein the first prismatic joint includes a first direction linear drive motor, and wherein the second prismatic joint includes a second direction linear drive motor.

12. A laser cutting machine, comprising:
a laser for generating a laser beam suitable for cutting a workpiece;
a platform configured to move along at least a first direction;
a galvano arranged on the platform, such that a motion of the platform along the first direction causes a motion of the galvano along the first direction, wherein an operation of the galvano directs the laser beam to the workpiece along at least a second direction, wherein the galvano is arranged on the platform such that the second direction is fixed with respect to the first direction during the operation; and a control module for controlling the motion of the platform and the operation of the galvano, such that the laser beam is directed concurrently along the first direction and along the second direction.

13. The machine of claim 12, wherein the galvano is arranged on the platform such that the first direction coincides with the second direction during the operation of the laser cutting machine.

14. The machine of claim 12, wherein the galvano is arranged on the platform such that the first direction forms an angle of 45 degrees with the second direction during the operation of the laser cutting machine.

15. The machine of claim 12, further comprising:
a motion system for moving the platform along the first direction.

16. The machine of claim 15, wherein the motion system includes a prismatic joint.

17. The machine of claim 12, wherein the galvano is arranged on the platform rotationally, such that mutual orientations of the first direction and the second direction can be changed before the operation of the machine.

18. The machine of claim 12, wherein the control module controls the motion of the platform and the operation of the galvano according to precomputed G-code defining a cutting path of the laser beam, such that a position of the laser beam on a workpiece is a vector sum of a motion along the first direction and a motion along the second direction.

19. A method for controlling an operation of a laser cutting machine, wherein the laser cutting machine includes a galvano arranged on a platform, such that a motion of the platform along a first direction and along a second direction causes a motion of the galvano along the first and the second directions, wherein a motion of the galvano directs a laser beam along a third direction, and along a fourth direction, and wherein mutual orientation of the first direction, the second direction, the third direction and the fourth direction is permanently fixed during the operation of the machine, comprising the steps of:
determining instructions for controlling the motion of the platform and the motion of the galvano, wherein the instruction defines a cutting path of the laser beam, such that a position of the laser beam on the cutting path is a vector sum of the motions along the first direction, the second direction, the third direction and the fourth direction; and
controlling concurrently the motion system and the motion of the galvano according to the instructions.

20. The method of claim 19, wherein the instructions include G-code.

* * * * *